US010848394B2

(12) United States Patent
Anderson et al.

(10) Patent No.: US 10,848,394 B2
(45) Date of Patent: Nov. 24, 2020

(54) VIRTUAL LOCAL LOOPS

(71) Applicant: Level 3 Communications, LLC, Broomfield, CO (US)

(72) Inventors: Derek S. Anderson, Denver, CO (US); Ryan T. Korte, Louisville, CO (US)

(73) Assignee: Level 3 Communications, LLC, Broomfield, CO (US)

(*) Notice: Subject to any disclaimer, the term of this patent is extended or adjusted under 35 U.S.C. 154(b) by 1129 days.

(21) Appl. No.: 14/450,495

(22) Filed: Aug. 4, 2014

(65) Prior Publication Data
US 2015/0295769 A1 Oct. 15, 2015

Related U.S. Application Data

(60) Provisional application No. 61/978,364, filed on Apr. 11, 2014.

(51) Int. Cl.
H04L 12/24 (2006.01)
H04L 29/06 (2006.01)
H04L 12/46 (2006.01)

(52) U.S. Cl.
CPC ...... H04L 41/5019 (2013.01); H04L 12/4641 (2013.01); H04L 65/1026 (2013.01); H04L 65/1069 (2013.01); H04L 65/1073 (2013.01); H04L 65/80 (2013.01)

(58) Field of Classification Search
CPC ............... H04L 41/0893; H04L 65/607; H04L 65/1013; H04L 65/80; H04L 41/5019; H04L 65/1069; H04L 65/1073; H04L 65/1026; H04L 12/4641
See application file for complete search history.

(56) References Cited

U.S. PATENT DOCUMENTS

| | | | |
|---|---|---|---|
| 2003/0030751 A1* | 2/2003 | Lupulescu | ......... H04N 5/44543 348/552 |
| 2005/0021713 A1 | 1/2005 | Dugan et al. | |
| 2005/0043020 A1 | 2/2005 | Lipsanen et al. | |
| 2005/0201320 A1 | 9/2005 | Kiss et al. | |
| 2006/0168656 A1* | 7/2006 | Stirbu | ................. H04L 12/2834 726/15 |

(Continued)

OTHER PUBLICATIONS

International Search Report, dated Jul. 8, 2015, Int'l Appl. No. PCT/US15/024857, Int'l Filing Date Apr. 8, 2015; 3 pgs.

(Continued)

Primary Examiner — Peter P Chau

(57) ABSTRACT

Aspects of the present disclosure involve systems, methods, computer program products, and the like, for implementing a high-quality Video over Internet Protocol (VoIP) network accessible through a public network, such as the Internet. More particularly, a user of a telecommunication network may access the VoIP through an Internet connection or other public network connection and is then connected to a virtual local loop for transmission across the VoIP. As such, the public network may act as an egress and/or ingress to the VoIP allowing users with public network connectivity access to the network. Thus, a virtual local loop providing the desired services and quality from the telecommunications network may be created for a user of the network, without the need of the user to directly connect into the VoIP.

17 Claims, 4 Drawing Sheets

(56) References Cited

U.S. PATENT DOCUMENTS

| | | | | |
|---|---|---|---|---|
| 2007/0067807 | A1* | 3/2007 | O'Neil | H04N 7/17318 |
| | | | | 725/62 |
| 2010/0208634 | A1* | 8/2010 | Eng | H04L 45/00 |
| | | | | 370/310 |
| 2010/0228854 | A1* | 9/2010 | Morrison | H04L 67/125 |
| | | | | 709/224 |
| 2010/0332656 | A1* | 12/2010 | Sullivan | H04W 48/18 |
| | | | | 709/225 |
| 2011/0083154 | A1* | 4/2011 | Boersma | H04N 21/637 |
| | | | | 725/109 |
| 2012/0113899 | A1 | 5/2012 | Overmars | |
| 2012/0311107 | A1 | 12/2012 | Van der Merwe et al. | |

OTHER PUBLICATIONS

Written Opinion of the International Searching Authority, dated Jul. 8, 2015, Int'l Appl. No. PCT/US15/024857, Int'l Filing Date Apr. 8, 2015; 6 pgs.

International Preliminary Report on Patentability, dated Oct. 12, 2016, Int'l Appl. No. PCT/US15/024857, Int'l Filing Date Apr. 8, 2015; 8 pgs.

"3rd Generation Partnership Project: Technical Specification Group Services and System Aspects; Multimedia telephony over IP Multimedia Subsystem (IMS); Study on Improved end-to-end QoS handling (Release 12)", 3GPP TR 26.924 V0.0.7, 3rd Generation Partnership Project (3GPP), Mobile Competence Centre; 650 Route des Lucioles; Retrieved from Internet http://www.3gpp.org/ftp/Meetings_3GPP_Sync/SA/SA4/Docs/; XP050803054 Apr. 10, 2014, 38 pgs.

Extended European Search Report, dated Nov. 23, 2017, Application No. 15776621.3, filed Apr. 8, 2015; 10 pgs.

Canadian Examination Report, dated Jun. 4, 2020, Application No. 2,945,301, filed Apr. 8, 2015; 3 pgs.

* cited by examiner

VIRTUAL LOCAL LOOPS

CROSS-REFERENCE TO RELATED APPLICATIONS

This application claims priority under 35 U.S.C. § 119(e) to U.S. Provisional Application No. 61/978,364 entitled "VIRTUAL LOCAL LOOPS", filed on Apr. 11, 2014 which is incorporated by reference in its entirety herein.

TECHNICAL FIELD

Aspects of the present invention generally relate to systems and methods for implementing a telecommunications network, and more specifically for providing a virtual private local loop for high quality network services accessible through a public network, such as the Internet.

BACKGROUND

Telecommunication networks provide for the transmission of information across some distance through terrestrial, wireless or satellite communication networks. Such communications may involve voice, data or multimedia information, among others. One particular aspect of such networks includes high quality telecommunication services, such as broadcast quality audio and video feeds for television or other multimedia presentations. In one example, high quality telecommunication services allow for a user to capture aspects of a live vent, such as a sporting event or concert, and transmit the broadband-type video and/or audio to a studio or other relay station for eventual airing of the event.

To transmit the video feed of the event from the location in which the event takes place to a mixing location (such as at a studio location), the user may request specific high quality services from the telecommunications network for the time in which the live event occurs. The network may then dedicate certain components and/or quality of service to the user during the event window, in accordance with one or more service agreements between the network and the network's customers. In some instances, the service agreements provide a level of quality and reliability to the customer's transmission that ensure the transmitted multimedia information arrives at the designated mixing location on time and with a certain level of quality to the transmitted signal.

It is with these and other issues in mind that various aspects of the present disclosure were developed.

SUMMARY

One implementation of the present disclosure may take the form of a method for providing services over a telecommunications network. The method includes the operations of receiving a request for telecommunication services from a requesting device, the telecommunications services comprising transmission of one or more high-definition multimedia signals through the telecommunications network, accessing an equipment database associated with the telecommunications network to determine a customer identification associated with the requesting device and registering an encoding device with the telecommunications network based at least on the customer identification. The method further includes scheduling one or more components in response to the request from the requesting device, creating a virtual private network (VPN) in the telecommunications network comprising the encoding device configured to encode the one or more high-definition multimedia signals, and commissioning the one or more components for transmission of the one or more high-definition multimedia signals through the telecommunications network.

Another implementation of the present disclosure may take the form of a system for operating a telecommunications network. The system includes a network component comprising a processor and a computer-readable medium associated with the processor. The computer-readable medium includes instructions stored thereon that are executable by the processor to receive a request for telecommunication services from a requesting device, the telecommunications services comprising transmission of one or more high-definition multimedia signals through the telecommunications network, access an equipment database associated with the telecommunications network to determine a customer identification associated with the requesting device, and register an encoding device with the telecommunications network based at least on the customer identification. The instructions are further executable to schedule one or more components in response to the request from the requesting device, create a virtual private network (VPN) in the telecommunications network comprising the encoding device configured to encode the one or more high-definition multimedia signals, and commission the one or more components for transmission of the one or more high-definition multimedia signals through the telecommunications network.

Yet another implementation of the present disclosure may take the form of a telecommunications network. The telecommunications network includes a registrar configured to register a user device with a Video on Internet Protocol (VoIP) network based at least on a request for telecommunication services received from a requesting device, the telecommunications services comprising transmission of one or more high-definition multimedia signals through the telecommunications network and the user device configured to encode the one or more high-definition multimedia signals, an equipment database for storing a customer identification associated with the requesting device, a scheduler for scheduling one or more components of the VoIP network in response to the request from the requesting device, the one or more components of the VoIP and the user device comprising a virtual private network (VPN), and a controller for commissioning the one or more components of the VoIP network for transmission of the one or more high-definition multimedia signals through the telecommunications network.

DETAILED DESCRIPTION

Aspects of the present disclosure involve systems, methods, computer program products, and the like, for implementing a virtual local loop for high quality network services accessible through a public network, such as the Internet. In one embodiment, the system and methods involve a virtual private network (VPN) for providing high quality telecommunication services, such as broadcast quality audio and video feeds. Through such high-quality VPNs, a local loop may be established for a customer to a telecommunications network that reserves certain services (such as video, data, and/or audio transmission) at a particular level of quality (such as high definition or broadband).

Further, in one particular implementation, access to a local loop is provided through a public network, such as the Internet. More particularly, a user of the telecommunication network may access the VPN through an Internet connection or other public network connection and is then connected to the local loop for transmission across the VPN. As such, the public network could act as an egress and/or ingress to the VPN allowing users with public network connectivity access to the VPN. Thus, a virtual local loop providing the desired services and quality from the telecommunications network may be created for a user of the network, without the need of the user to directly connect into the VPN.

In general, a user, utilizing a user device, connects to a public network. Through the public network, the user device is connected to the high quality VPN and is registered with the VPN. In one embodiment, the user device includes a user interface that communicates with the VPN to facilitate the registration process with the VPN. Once registered, a virtual local loop may be created within the VPN for transmission of high quality signals through the VPN. For example, the virtual local loop may be used to transmit broadband video and audio signals to a destination device associated with the VPN. In one example, the local loop is scheduled and reserved for the transmission of the signals by the user device through the user interface on the user device. In another embodiment, the user device may be associated with a group established by the VPN for transmission of the signals. In this manner, a user of a telecommunications network may utilize a virtual local loop for high quality network services accessible through a public network, such as the Internet.

Figure 1:
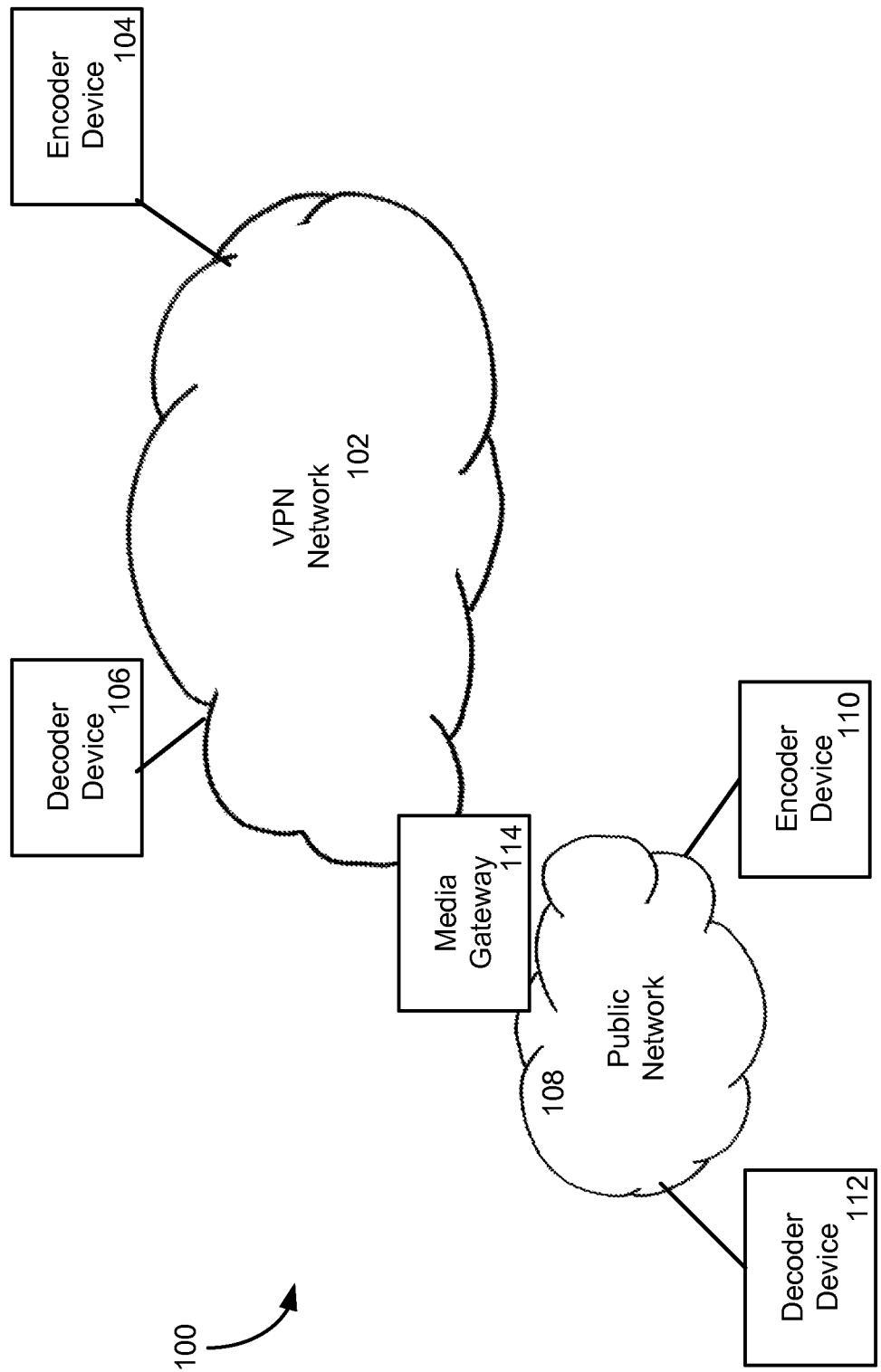
FIG. 1 schematic diagram illustrating an exemplary Voice over Internet Protocol (VoIP) operating environment in accordance with one embodiment.

FIG. 1 illustrates an exemplary operating environment 100 for a virtual local loop of a high quality VPN. The environment 100 provides for establishing communication sessions between network users. With specific reference to FIG. 1, the environment 100 includes a VPN 102, which may be provided by a wholesale network service provider. In one embodiment, the VPN 102 is a Video over Internet Protocol (VoIP) type of telecommunications network. However, while the environment 100 of FIG. 1 shows a configuration using the VoIP network 102, it should be appreciated that portions of the network 102 may include non IP-based routing. For example, network 102 may include devices utilizing time division multiplexing (TDM) or plain old telephone service (POTS) switching. In general, the network 102 of FIG. 1 may include any communication network devices known or hereafter developed.

The VoIP network 102 includes numerous components such as, but not limited to gateways, routers, and registrars, which enable communication across the VoIP network 102, but are not shown or described in detail here because those skilled in the art will readily understand these components. More relevant to this description is the interaction and communication between the VoIP network 102 and other entities, such as the one or more customer home or business local area networks (LANs) 106, where a participant in a conference will connect with the system for the conference.

The VoIP network 102 may be configured to provide high quality services to one or more users of the network. For example, the network 102 may be configured to provide local loops to a customer where the network guarantees a certain level of quality to the provided service. For example, a customer to the network 102 may utilize the network to transmit a broadband-type video and/or audio signal from an encoder device 104 to a decoder device 106. Such a situation may occur in relation to a sporting or other type of live event. To transmit the video feed of the live event from the location in which the event takes place to a mixing location (such as at a studio location associated with the customer), the customer may request specific services from the network 102 for the time in which the live event occurs. Such services may entail a certain amount of available bandwidth through the network 102 during the event window that ensures the video feed of the event is not interrupted during the transmission of the data through the network. To do this, the network 102 may be configured to receive a request for the services from the customer for a specific period of time on a specific date. In response, the network 102 may reserve several network components to ensure that the requested bandwidth and level of service is provided to the customer at the requested time. During the event, an encoder device 104 associated with the customer encodes the video/audio feed for transmission through the network 102. In addition, a decoder device 106 also associated with the customer decodes the received encoded feed for use by the customer. In this manner, the network 102 provides a reserved pipeline through the network for the customer based on a customer request that provides the desired level of services. As described in more detail below with reference to FIG. 2, the network 102 may include any number of components that facilitate the request and reservation of components and services of the network for transmission of data over a local loop of the network.

In addition to providing local loops to customers connected directly to the network 102, one embodiment of the present disclosure also provides connection to the network through one or more public networks 108. In general, this embodiment provides an ingress and/or egress to the VoIP network 102 through the one or more public networks 108. Thus, a customer to the network 102 may connect to the VoIP network 102 through the public network 108 without the need of connecting directly to the VoIP network. In one embodiment, the public network 108 is the Internet.

Requesting and reservation of services from the VoIP network 102 occurs through the public network 108 in much the same way as when the customer's devices are connected directly to the VoIP network. For example, an encoder device 110 associated with the customer may be in communication with the public network 108. The encoder device 110 may also provide the request to the VoIP network 102 to reserve the services from the network. This request may be transmitted through a media gateway 114 that forms the connection between the public network 108 and the VoIP network 102. In one embodiment, the request (and any subsequent communication between the networks 102,108) may be in IP-based packets for transmission through the media gateway 114. Upon receiving the request, the VoIP network 102 may reserve the requested access to the network for transmission of data through the network and return an acknowledgement to the encoder device 110. Similar to the request, the acknowledgement from the network 102 to the encoder device 110 may be transmitted through the media gateway 114 to the public network 108 and on to the encoder device 110.

In addition, the decoder device 112 that receives the encoded signal from the network 102 may be connected to the public network 108. In this manner, the public network 108 provides an interface to and from the VoIP network 102 for transmission of the high quality data. In other embodiments, however, the decoder device 106 may be connected directly to the VoIP network 102 such that the encoded data transmitted from the encoder device 110 is transmitted through the public network 108, to the network, and to the decoder device 106 connected to the network. Similarly, the encoder device 104 may be connected directly to the VoIP network 102 while the decoder device 112 is connected to the public network 108. In general, any combination of devices connected to the public network 108 and the VoIP network 102 is contemplated.

Further, although described above as the encoder device 104,110 providing the request for the transmission reservation of the VoIP network 102, it is not required that the encoder device perform the reservation. Rather, the reservation for the network services may be received by the network 102 from any device associated with the customer. For example, the customer may use a desktop computer or mobile device connected to or otherwise associated with the network 102 to request the services from the network, while the encoder device 104,110 is a separate device from the requesting device. Then, upon initiation of the designated window for the event, the network 102 reserves one or more components of the network to provide the requested service to the customer. However, for simplicity, it is described herein as the encoder device (or device associated with the encoder device) as requesting the services from the network 102.

Figure 2:
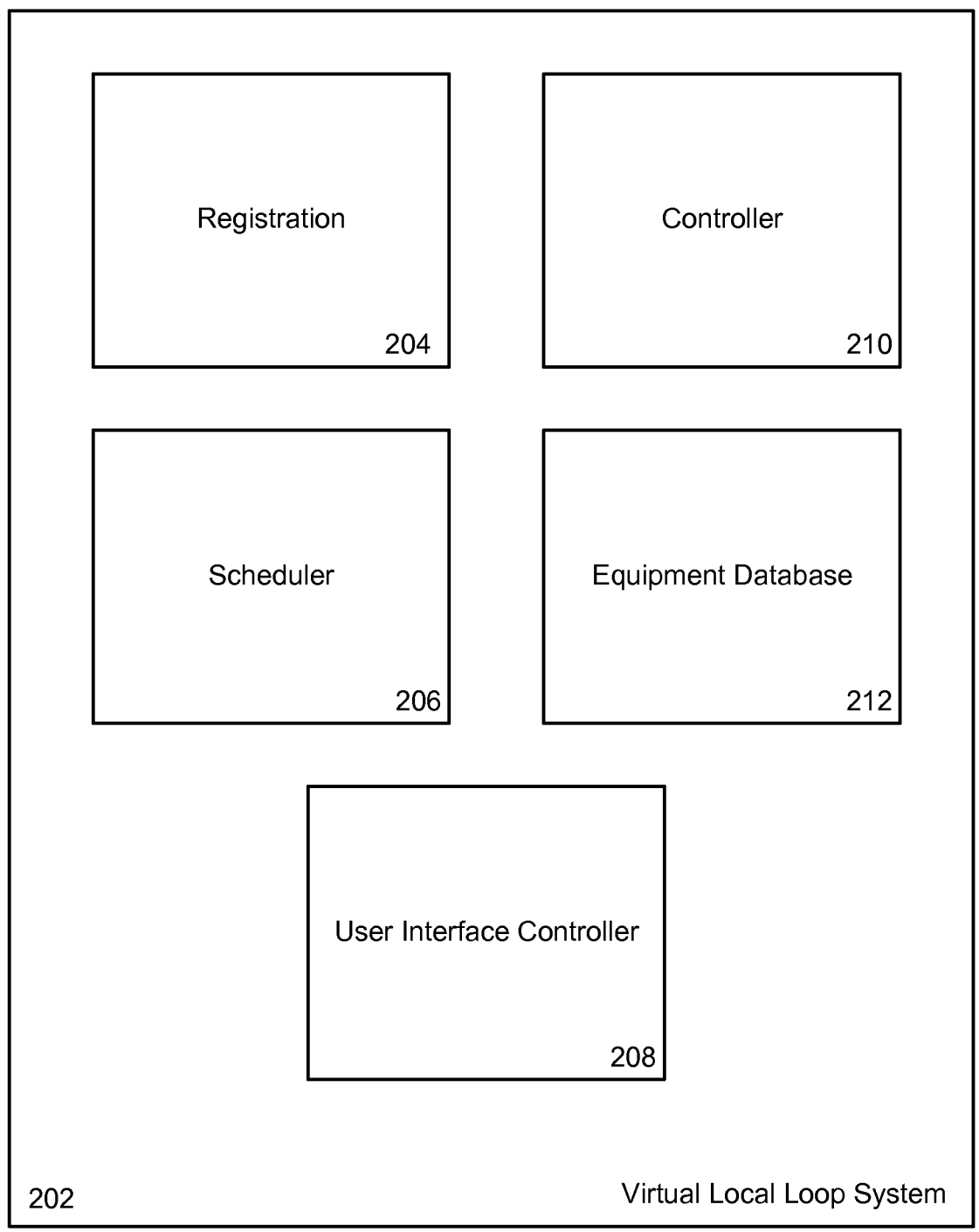
FIG. 2 is a schematic diagram illustrating an exemplary virtual local loop system in a telecommunications network.

As mentioned above, the VoIP network 102 may include one or more components that facilitate reserving and providing the requested services to the customer. FIG. 2 is a schematic diagram illustrating an exemplary virtual local loop system in a telecommunications network. In general, the virtual local loop system 202 of FIG. 2 includes several components, including (but not limited to), a registration component 204, a scheduler component 206, a controller component 210, and equipment database 212 and a user interface control component 208. Additional or fewer components may be included in the virtual local loop system 202. Further, the components of the virtual local loop system 202 may be included in a single device within the VoIP network 202 or may be housed in any number of components of the network. The operations of each of the components of the virtual local loop system 202 may be performed through a series of software instructions, hardware components or a combination of both software and hardware. The general operations of each component of the virtual local loop system 202 are described in more detail below.

In general, the registration component 204 of the virtual local loop system 202 registers users with the VoIP network 102 for reserving one or more services provided by the network by maintaining information and/or preferences of customer to the network. In particular, the registration component 204 may receive and maintain a network identity through which the customer is contacting the network 102, an IP address associated with the customer's encoder device 104, 110, the type of encoder device of the customer, information concerning an event, such as date, time, and duration of the event, and the like. Further, the registration component 204 may keep a customer or customer's device registered with the VoIP network 202 for some period of time, perhaps based on customer or network preferences.

Figure 3:
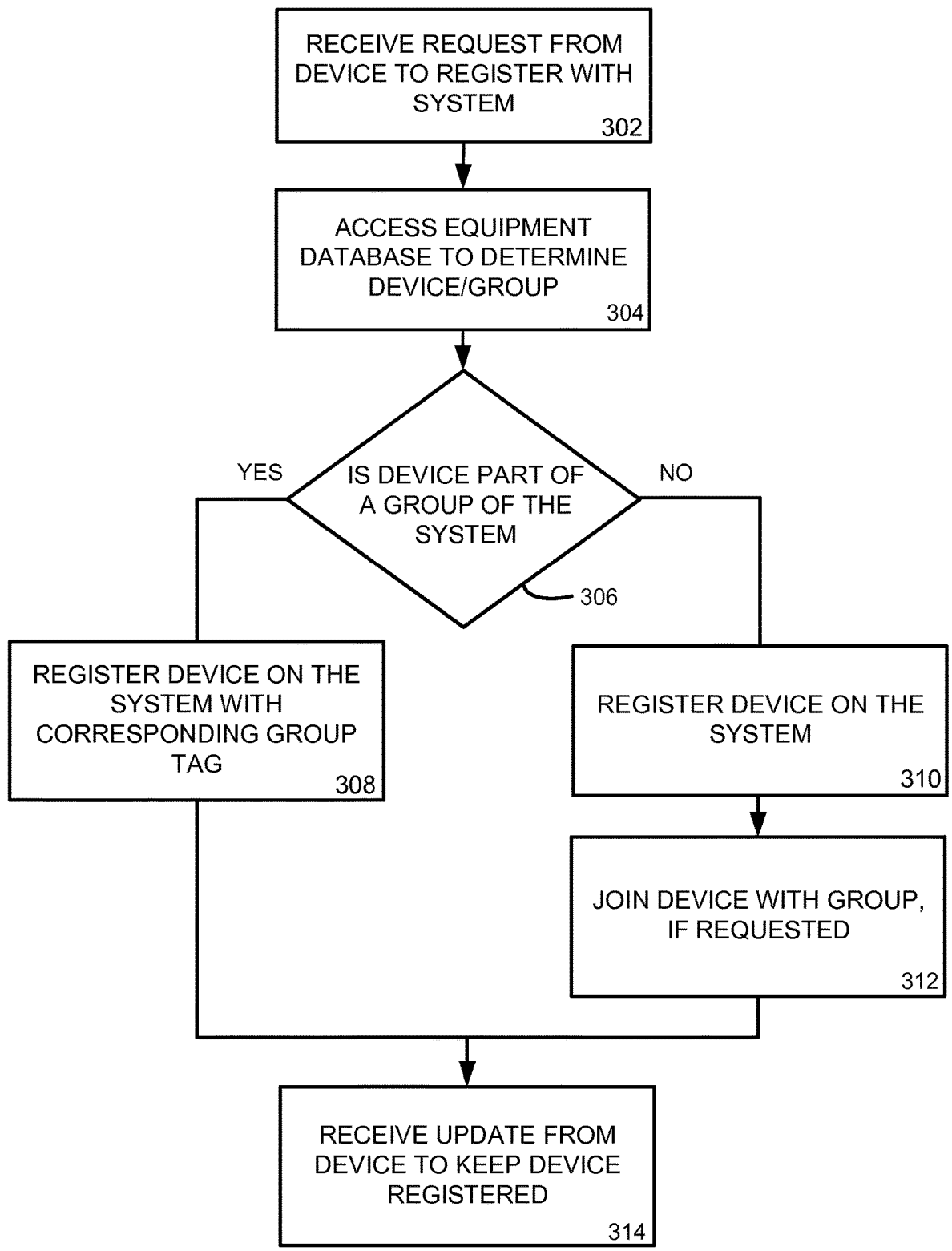
FIG. 3 is a flowchart illustrating a method for registering a communications device with a virtual local loop system.

Some of the operations and features of the registration component 204 of the virtual local loop system 202 are described in more detail below with reference to FIG. 3.

The virtual local loop system 202 also includes a scheduler component 206. The scheduler component 206 schedules (or reserves) the components of the network 102 for the requested time based on the customer request. In general, the scheduler component 206 schedules the proper components of the network 102 to provide the customer with the desired level of quality of transmission through the network in response to a customer request and one or more service agreements with the customer. The scheduler component 206 may operate in conjunction with the controller component 210 to reserve the network 102 bandwidth at the scheduled time requested by the customer and in conjunction with the registration of the customer with the virtual local loop system 202. In general, the controller component 210 operates to facilitate the registration and scheduling operations described herein.

Another component included in the virtual local loop 202 is the equipment database 212. The equipment database 212 is configured to maintain a listing of possible encoder and decoder devices supported by the network 102. Thus, when a request is a received at the registration component 204 from a user device, the registration component may access the equipment database 212 to obtain information about the device associated with the customer. For example, the registration component 204 may compare received information about the customer's device to a listing of devices in the equipment database 212 to determine the make and model of the customer's device. Further, the equipment database 212 may maintain information concerning specific devices registered with the VoIP network 102. Thus, upon receiving some identifying information from the encoder or decoder device associated with a customer, the registration component 204 may determine which particular customer to which the device belongs or is associated. The use of the equipment database 212 by the registration component 204 to determine a specific customer to the network 102 is described in more detail below with reference to FIG. 3.

The virtual local loop system 202 may also include a user interface controller 208 configured to interact with a user interface program associated with the user's encoder or decoder device. In general, the user interface controller 208 communicates with the user interface of the user's encoder or decoder to respond to inputs and provide information to the user interface. The user interface controller 208 may be utilized in the embodiment described above where a user registers with the VoIP network 102 through a public network 108, such as the Internet. The operation and general user interaction with the user interface of the encoder device is described in more detail below.

In order to create a virtual local loop for a customer to the network 102 that accesses the network through a public network 108, the virtual local loop system 202 may register users to the system utilizing one or more of the components of the system. In particular, FIG. 3 is a flowchart illustrating a method for registering a communications device with a virtual local loop system. In general, the operations of FIG. 3 are performed by one or more of the components of the virtual local loop system 202, such as the controller component 210 and/or the registration component 204.

Beginning in operation 302, the registration component 204 of the virtual local loop system 202 receives a request to register with the network 102 from a user device. In one example, the user device is an encoder device associated with the user accessing the network 102 either directly or through a public network 108. In another example, the request is received from a device associated with the user that communicates with the virtual local loop system 202, such as a desktop computer, mobile device, and the like. An application programming interface (API) may be located between the requesting device and the registration component 204 to translate messages between the device and the registration component to facilitate registration of one or more devices with the network 102.

In operation 304, the registration component 204 of the virtual local loop system 202 accesses the equipment database 212 in response to receiving the request to register with the network 102. In particular, the request to join the network 102 may include some identifying information for the requesting/registering device and/or the user associated with the registering device. For example, the request may include a serial number, media access control (MAC) address, IP address and the like associated with the requesting device that identifies the device and/or the virtual location of the device. With the identifying information, the registration component 204 may identify the type of device that provided the request or is the subject of the request to determine certain characteristics of the device, such as encoding protocol used by the device. Thus, the equipment database 212 may store and maintain different types of devices supported by the network 102 that can be identified through the information contained in the request to register.

In addition, the equipment database 212 may store and maintain information about specific devices that have already registered with the network 102 at some time in the past. Such information may include the identity of the user associated with the device, whether that user is a member of a group of users associated with the virtual local loop system 202, other devices also registered with user, whether the user is authorized to register with the network, and the like. The user information associated with the registering device is utilized by the virtual local loop system 202 as described in more detail below.

In operation 306, the virtual local loop system 202 determines if the registering user (or registering device) is associated with a group of the system. In one embodiment of the network 102, several devices may be associated with a group established by the network. For example, a customer, such as a broadcast network, may have several encoder/decoder devices associated with that customer to broadcast an event. Rather than registering each device individually, the devices may be associated with a group identifier to simplify the registration process for the several devices associated with the customer. A device associated with the network may be included in any number of group identifiers such that the device belongs to multiple groups of the network. Thus, upon obtaining an identifier of a registering device, the system 202 determines if the device is associated with a group of the network. In one embodiment, the identification of the group associated with the device is received from the registering device, perhaps through the user interface of the device described below.

If the registering device is associated with a group as determined through the equipment database 212, then the registration component 204 registers the device with the network 102 with an identification of the group to which the device belongs, as shown in operation 308. If the registering device is not associated with a group, then the device is registered with the network 102 in operation 310. Also, in operation 312, the registration component 204 may request or receive a group identification to which the device would like to join. Such a request may be handled by the registration component 204 upon receipt of the request and may include an authorization code from the device to be associated with a particular group.

In operation 314, the registration component 204 of the virtual local loop system 202 may receive an indication from the registered device that the device is still connected to the network 102. In response, the registration component 204 maintains the device registration with the system 102. However, if such an indication is not received from the registered device after a particular time period, the system 202 may remove the registration of the device such that the device re-registers to the network 102 to use the network services. In other words, the registration of device on the network 102 may be periodically updated to ensure that the device is communicating with the network. In one embodiment, the registered device transmits an update signal to the virtual local loop system 202 to restart a countdown clock. When the countdown clock reaches zero, the system 202 may remove the registration of the device from the network 102. In another embodiment, the system 202 pings the registered device periodically to determine if the device is still connected to the network. In yet another embodiment, devices that are registered with the network 102 may retain the registered status with the network with no removal of the registration by the virtual local loop system, regardless of the device's connection status with the network.

As mentioned above, the virtual local loop system 202 includes a user interface controller component 208 that communicates with a user interface instantiated on a user's device to respond to inputs and provide information to the user interface. Thus, some device associated with the user of the network 102 may include a program that presents the user of the device with an interface through which the user may interact with the virtual local loops system 202 and the network 102. In one embodiment, the user interface is a drop down menu on a device associated with a user of the network.

The user interface of the user device (and the associated user interface controller 208 of the virtual local loop system 202) provides an interface through which a user of the network 102 selects and transmits information to the system. For example, the user interface may include a list of devices associated with the user from which the user can select to register one or more of the listed devices. Further, each listing may include identifying information for the corresponding user device, such as an IP or MAC address. In one embodiment, such identifying information is provided to the user interface from the equipment database 212 and user interface controller 208 of the virtual local loop system 202. In addition, the user may use the user interface to reserve the network 102 services at a specific time, such as through the selection of a specific bandwidth needed, date and time of the reservation, and a destination device for the transmission through the network. In general, the user may utilize the user interface to provide any information to the network 102 and the virtual local loop system 202 to reserve the network services for transmission of data through the network.

Through the embodiment described above, a user of a high-quality VoIP network may achieve access to a local loop through a public network, such as the Internet. More particularly, a user of the telecommunication network may access the VoIP through an Internet connection or other public network connection and is then connected to the local loop for transmission across the VoIP. As such, the public network could act as an egress and/or ingress to the VoIP allowing users with public network connectivity access to the network. Thus, a virtual local loop providing the desired services and quality from the telecommunications network may be created for a user of the network, without the need of the user to directly connect into the VoIP.

In one embodiment of the virtual local loop system, the system may detect the presence of a component on the network and obtain information from the component for scheduling and control of the component. In one particular example, the system may scan the network to determine the connection of an encoder component or other customer component to the network. When a customer component is detected, the component may be scanned by the network to determine one or more technical capabilities of the component, referred to herein as the component's "fingerprint". The fingerprint may include any information concerning the customer component, such as a manufacturer and model of the component, the technical capabilities of the component and/or the association of the component to a particular customer to the network. In another example, the component may provide an indication to the network that it is connected and, in response, the network may perform the scan of the component.

The information obtained from the scanned component may be utilized by the network for a variety of network operations. For example, once the technical capabilities of the component are determined, the network may process the scheduling request from the component and determine if the component has the necessary capabilities to match the request. In another example, the information obtained through the scan of the component may aid the system in controlling the transmission of content through the network related to the component. For example, a particular communication protocol that is supported by the component may be selected by the system for transmitting one or more messages from/to the component during the scheduled transmission time. In general, any information that may be obtained from a device through an analysis of the device by the system may be utilized to aid in the scheduling or controlling of transmissions through the network associated with the component.

Figure 4:
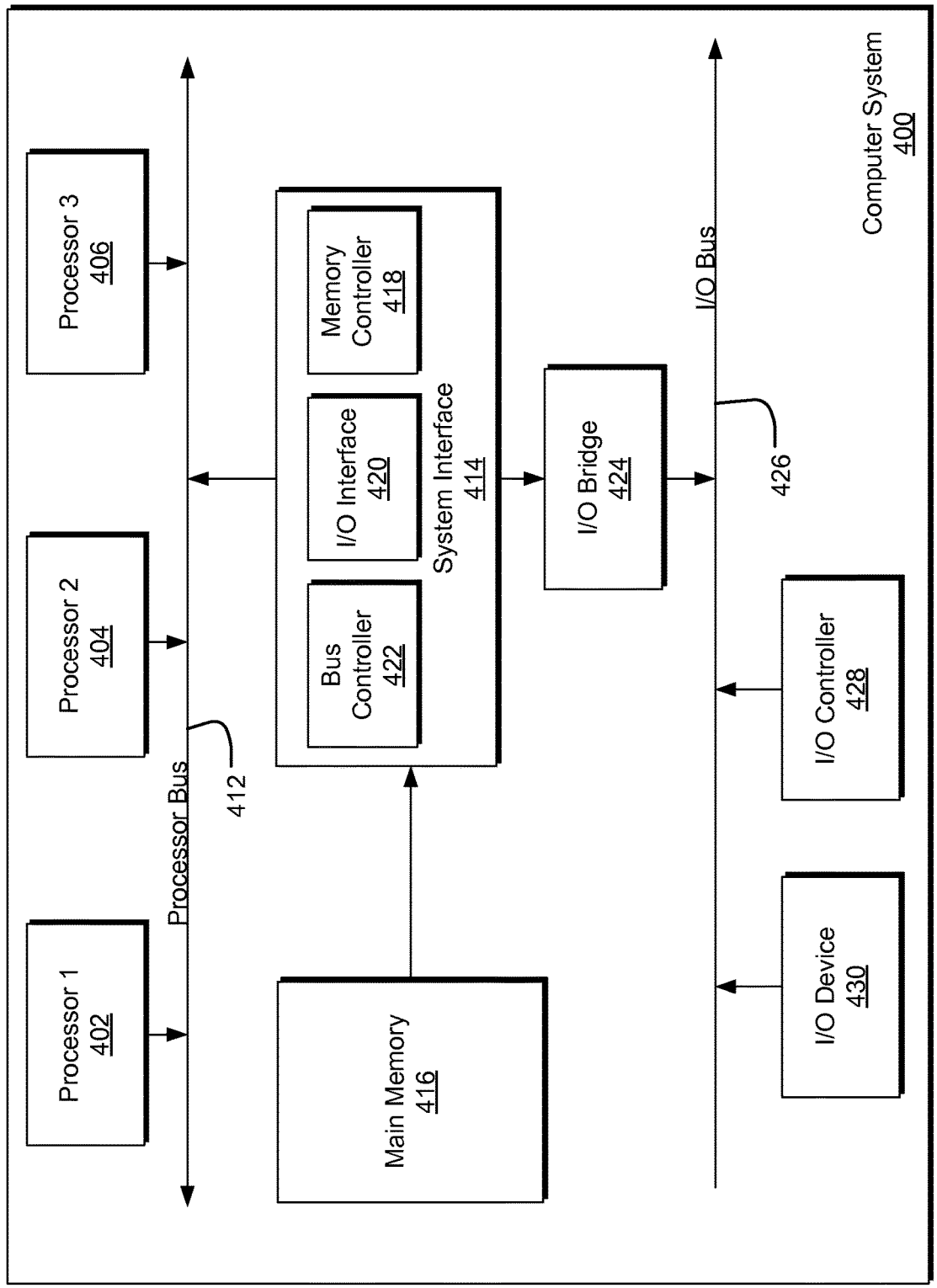
FIG. 4 is a diagram illustrating an example of a computing system which may be used in implementing embodiments of the present disclosure.

FIG. 4 is a block diagram illustrating an example of a computing device or computer system 400 which may be used in implementing the embodiments of the components of the network disclosed above. For example, the computing system 400 of FIG. 4 may be used to implement the various components of the virtual local loop system 202 discussed above. The computer system (system) includes one or more processors 402-406. Processors 402-406 may include one or more internal levels of cache (not shown) and a bus controller or bus interface unit to direct interaction with the processor bus 412. Processor bus 412, also known as the host bus or the front side bus, may be used to couple the processors 402-406 with the system interface 414. System interface 414 may be connected to the processor bus 412 to interface other components of the system 400 with the processor bus 412. For example, system interface 414 may include a memory controller 414 for interfacing a main memory 416 with the processor bus 412. The main memory 416 typically includes one or more memory cards and a control circuit (not shown). System interface 414 may also include an input/output (I/O) interface 420 to interface one or more I/O bridges or I/O devices with the processor bus 412. One or more I/O controllers and/or I/O devices may be connected with the I/O bus 426, such as I/O controller 428 and I/O device 440, as illustrated.

I/O device 440 may also include an input device (not shown), such as an alphanumeric input device, including alphanumeric and other keys for communicating information and/or command selections to the processors 402-406. Another type of user input device includes cursor control, such as a mouse, a trackball, or cursor direction keys for communicating direction information and command selections to the processors 402-406 and for controlling cursor movement on the display device.

System 400 may include a dynamic storage device, referred to as main memory 416, or a random access memory (RAM) or other computer-readable devices coupled to the processor bus 412 for storing information and instructions to be executed by the processors 402-406. Main memory 416 also may be used for storing temporary variables or other intermediate information during execution of instructions by the processors 402-406. System 400 may include a read only memory (ROM) and/or other static storage device coupled to the processor bus 412 for storing static information and instructions for the processors 402-406. The system set forth in FIG. 4 is but one possible example of a computer system that may employ or be configured in accordance with aspects of the present disclosure.

According to one embodiment, the above techniques may be performed by computer system 400 in response to processor 404 executing one or more sequences of one or more instructions contained in main memory 416. These instructions may be read into main memory 416 from another machine-readable medium, such as a storage device. Execution of the sequences of instructions contained in main memory 416 may cause processors 402-406 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 416. Common forms of machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

We claim:

1. A method for providing services over a telecommunications network, the method comprising:
   receiving a request for telecommunication services from a requesting device, the telecommunications services comprising transmission of one or more high-definition multimedia signals through the telecommunications network, and the request comprising a date and time corresponding to a multimedia event;
   accessing an equipment database associated with the telecommunications network to determine a customer identification associated with the requesting device;
   registering an encoding device with the telecommunications network based at least on the customer identification, the encoding device configured to encode the one or more high-definition multimedia signals;
   scheduling one or more components of the telecommunications network in response to the request from the requesting device, the scheduling comprising reserving the one or more components of the telecommunications network at the date and time for the multimedia event in the request; and
   commissioning the one or more components for transmission of the one or more high-definition multimedia signals through the telecommunications network.

2. The method of claim 1 wherein the request for telecommunication services is received from the requesting device utilizing a public access network.

3. The method of claim 2 wherein the public access network is Internet.

4. The method of claim 1, further comprising creating a virtual private network (VPN) in the telecommunications network, the VPN comprising a decoder device associated with a customer, the decoder device configured to receive an encoded high-definition multimedia signal from the encoding device and decode the encoded high-definition multimedia signal.

5. The method of claim 4 further comprising:
   detecting the encoding device as connected to the telecommunications network; and
   analyzing the encoding device to obtain one or more identifiers of the encoding device.

6. The method of claim 5 further comprising:
   comparing the one or more identifiers of the encoding device to at least one entry in the equipment database associated with the telecommunications network to determine a customer identification associated with the encoding device.

7. A system for operating a telecommunications network, the system comprising:
   a network component comprising:
      a processor; and
      a non-transitory computer-readable medium associated with the processor and including instructions stored thereon and executable by the processor to:
   receive a request for telecommunication services from a requesting device, the telecommunications services comprising transmission of one or more high-definition multimedia signals through the telecommunications network, and the request comprising a date and time corresponding to a multimedia event;
   access an equipment database associated with the telecommunications network to determine a customer identification associated with the requesting device;
   register an encoding device with the telecommunications network based at least on the customer identification, the encoding device configured to encode the one or more high-definition multimedia signals;
   schedule one or more components of the telecommunications network in response to the request from the requesting device, the scheduling comprising reserving the one or more components of the telecommunications network at the date and time for the multimedia event in the request; and
   commission the one or more components for transmission of the one or more high-definition multimedia signals through the telecommunications network.

8. The system of claim 7 wherein the request for telecommunication services is received from the requesting device utilizing a public access network.

9. The system of claim 8 wherein the public access network is Internet.

10. The system of claim 7 wherein the instructions executable by the processor further create a virtual private network (VPN) in the telecommunications network, the VPN comprising a decoder device associated with a customer, the decoder device configured to receive an encoded high-definition multimedia signal from the encoding device and decode the encoded high-definition multimedia signal.

11. The system of claim 10 wherein the instructions executable by the processor further:
    detect the encoding device as connected to the telecommunications network; and
    analyze the encoding device to obtain one or more identifiers of the encoding device.

12. The system of claim 11 wherein the instructions executable by the processor further:
    compare the one or more identifiers of the encoding device to at least one entry in the equipment database associated with the telecommunications network to determine a customer identification associated with the encoding device.

13. A telecommunications network comprising:
    a registrar configured to register a user device with a Video on Internet Protocol (VoIP) network based at least on a request for telecommunication services received from a requesting device, the telecommunications services comprising transmission of one or more high-definition multimedia signals through the telecommunications network, the request comprising a date and time corresponding to a multimedia event, and the user device configured to encode the one or more high-definition multimedia signals;
    an equipment database for storing a customer identification associated with the requesting device;
    a scheduler for scheduling one or more components of the VoIP network in response to the request from the requesting device, the scheduling comprising reserving the one or more components of the VoIP network at the date and time for the multimedia event in the request, the one or more components of the VoIP network and the user device comprising a virtual private network (VPN); and
    a controller for commissioning the one or more components of the VoIP network for transmission of the one or more high-definition multimedia signals through the telecommunications network.

14. The telecommunications network of claim 13 further comprising:
    a user interface controller for receiving the request for telecommunication services from the requesting device.

15. The telecommunications network of claim 14 wherein the user interface controller comprises an application program interface (API) configured to translate one or more instructions from the requesting device.

16. The telecommunications network of claim 13 wherein the request for telecommunication services is received from the requesting device utilizing a public access network.

17. The telecommunications network of claim 16 wherein the public access network is Internet.

* * * * *